Dec. 18, 1951         J. C. KURTZ ET AL         2,579,195
FOCUSING MECHANISM FOR MICROSCOPES
Filed Oct. 20, 1948
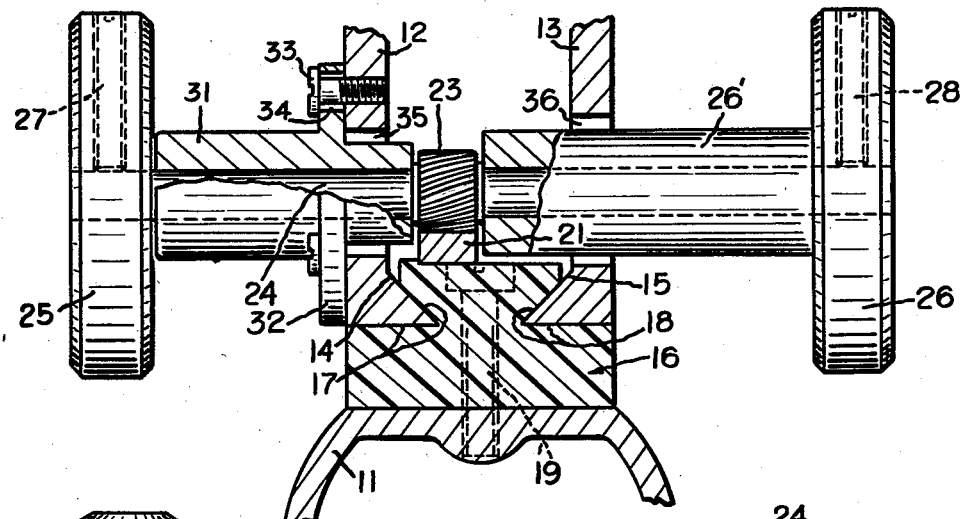
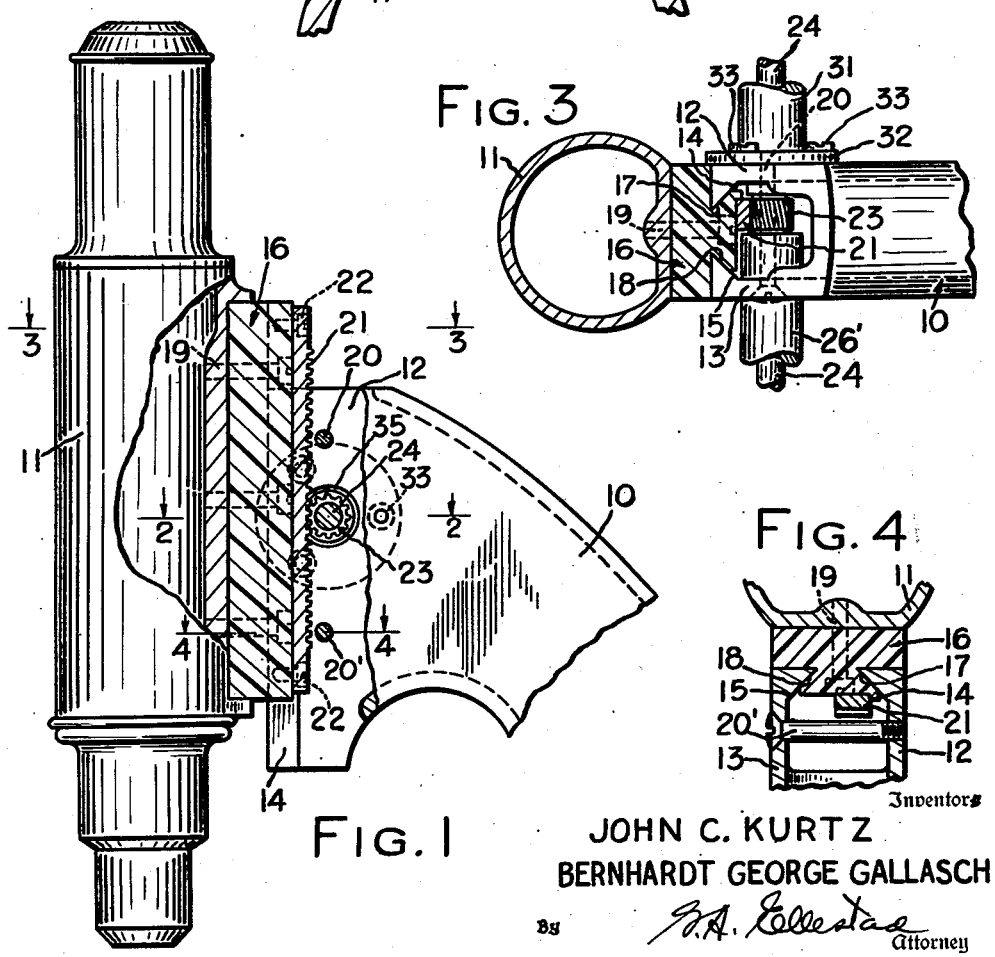
Inventors
JOHN C. KURTZ
BERNHARDT GEORGE GALLASCH
By G. A. Ellestad
Attorney

Patented Dec. 18, 1951

2,579,195

UNITED STATES PATENT OFFICE 2,579,195

FOCUSING MECHANISM FOR MICROSCOPES

John C. Kurtz, Irondequoit, and Bernhardt George Gallasch, Rochester, N. Y., assignors to Bausch & Lomb Optical Company, Rochester, N. Y., a corporation of New York Application October 20, 1948, Serial No. 55,468

3 Claims. (Cl. 88—39)

This invention relates to improvements in microscopes and more particularly it relates to the construction of the parts that are used for focusing the microscope.

In microscopes of the prior art, smooth, accurate focusing operations required that the dovetailed slides which connect the lens tube to the stand be carefully fitted and lapped. The rack and pinion mechanism also has to be carefully adjusted so as to provide the proper coaction between the parts to produce smooth, accurate focusing movements. Such fittings and adjustments not only require a high degree of mechanical skill but also consume a great deal of time.

One of the objects of the present invention is to provide a microscope having improved focusing means which will be relatively simple in structure yet efficient in operation. A further object is to provide a microscope having means for adjusting the frictional engagement between the slide and stand while still supporting on the stand the rotatable pinion shaft. Another object is to provide in a microscope improved slide means which will be relatively inexpensive in construction though capable of affording smooth, accurate focusing adjustments. Still another object is to provide a microscope having means for adjustably positioning the pinion relative to the rack on the lens tube.

These and other objects and advantages reside in certain novel features of construction, arrangement and combination of parts as will hereinafter be more fully described and pointed out in the appended claims.

Referring to the drawings:

Fig. 1 is a fragmentary side elevation, partly in section, of a microscope incorporating a preferred form of the invention, Fig. 2 is an enlarged sectional view taken on the line 2—2 of Fig. 1, Fig. 3 is a sectional view taken on line 3—3 of Fig. 1, and Fig. 4 is a sectional view taken on the line 4—4 of Fig. 1.

A portion of a microscope is shown in Fig. 1 as comprising an arm 10, assembled in any desired manner upon a conventional base (not shown), on which is slidably mounted a lens tube 11. On the upper portion of arm 10, a pair of outstanding parallel walls 12 and 13 have a substantially U-shape as best shown in Fig. 3. Adjacent the edges of walls 12 and 13, there are formed inclined slideways or gibs 14 and 15 on which a slide 16 is mounted by a pair of fitted dovetailed slideways 17 and 18. Screws 19 secure the lens tube 11 to the slide 16. An important saving in manufacturing cost is effected by making the walls 12 and 13 slightly yieldable and providing a pair of screws 20 and 20' (Fig. 4) near the top and bottom respectively of the walls so that the frictional engagement between the slide 16 and the slideways 14 and 15 may be adjusted. The slide 16 may thereby be fitted quickly without expensive fitting operations to the slideways 14 and 15. For moving the slide 16 and lens tube 11, a rack 21 attached to the slide 16 by screws 22 and meshed with a pinion 23 is used. A pinion shaft 24 fixed to the pinion 23 is journaled in the arm 10 and is rotated by the knobs 25 and 26 which are attached to the opposite ends of the shaft by set screws 27 and 28.

For the purpose of improving focusing movements of the lens tube 11, it has been found advantageous to form the slide 16 from a block of non-metallic plastic material such as a synthetic resin. The advantage of such a material lies in the fact that when the flat surfaces 17 and 18 are produced on the plastic block 16 by ordinary machine processes such as milling, a very large number of shallow recesses are formed by the cutting tool incident to the milling operation. These recesses extend in a continuous pattern entirely over surfaces 17 and 18 and are evenly distributed so that when a lubricant is applied to the surfaces, it remains in the recesses semi-permanently and provides an excellent film of lubrication over every part of the surfaces. If the surfaces 17 and 18 are moved when in contact with surfaces 14 and 15, lubricant is carried from the recesses up over the crests or high spots between the recesses whereon the surfaces 14 and 15 rest, thus lubricating the mating surfaces and reducing the coefficient of friction therebetween to a very low value. Because of the low coefficient of friction, the plastic and the metallic sliding surfaces may be fitted together with very light surface pressure, thus resulting in a smooth and easy sliding action, free from any abrupt motion. The light pressure also makes it possible to adjust the slide 16 substantially permanently since wear on the sliding parts is slight over long periods of use. It is not necessary that the entire slide 16 be made of the specified plastic material, so long as the slideways 17 and 18 are formed of such a plastic material.

A novel feature of this invention is the sleeve-like bearing member 31 in which the pinion shaft 24 is journaled close to the pinion 23 in cantilever style so as to provide support for the shaft 24 on only one side of the pinion 23. The bearing member 31 is supported on a vertical wall of the arm 10 by an integral radial flange 32 which is clamped to the arm by cap screws 33. In order to adjust the pitch line clearance between the rack 21 and pinion 23, i. e., to remove the backlash between the teeth, the bearing member 31 is moved laterally in a plane substantially normal to the plane of the pitch line of the rack 21. Such lateral adjustment of member 31 is here achieved very simply by providing its radial flange 32 with oversize screw holes 34, thus permitting the flange to be shifted along the arm 10 laterally with respect to shaft 24 when screws 33 are loosened. As shown in Fig. 2, the pinion shaft 24 carries on its right end the knob 26 having an integral hub portion 26'. Holes 35 and 36 are provided in the walls 12 and 13, respectively, of sufficient size to leave substantial radial clearances around the bearing member 31 and hub 26' to permit lateral movements of the pinion shaft.

When adjusting the pitch line clearance between the rack and pinion, the screws 33 are loosened and the bearing member 31 is urged towards the rack 21 until the tooth pressure between the rack and pinion is satisfactory. By then tightening the screws 33, the pinion is locked in place and the flange 32 is firmly seated against the arm 10 to hold the pinion in correct alignment with the rack.

It will be noted that the shaft 24 and pinion 23 are supported solely by the bearing 31 and that the hub 26' is free of the wall 13 so that no binding of the shaft in its bearing 31 can occur when the walls 12 and 13 are deflected by the screws 20 and 20' in adjusting the slide 16. By making the holes 35 and 36 of ample size, even misalignment of the outer end of the shaft 24 or eccentricity of hub 26' does not interfere with proper smooth operation of the rack and pinion.

From the foregoing it will be apparent that we are able to attain the objects of our invention and provide improved means whereby focusing movements of a microscope may be effected. The use of the plastic material for the slideways together with the adjustable gibs enable us to provide a microscope, which will have a smooth, accurate focusing movement, and is capable of being produced with a minimum of labor and manufacturing costs. The focusing mechanism is also simplified, without sacrificing smooth, accurate performance, by mounting the pinion shaft on the sleeve bearing which is attached to only one side wall of the arm. Since the frictional engagement of the slide 16 with the gibs 14 and 15 may be adjusted by means of the screws 20 and 20', it is necessary to support the pinion shaft on only one of the side walls of the arm. Otherwise, the adjustment of screws 20 and 20' would cause a deflection of walls 12 and 13 which would produce a binding of shaft 24.

Although but one form of the invention has been shown and described in detail, other forms and modifications are possible and changes may be made in the precise forms shown without departing from the spirit of the invention as defined in the appended claims.

We claim:

1. A microscope comprising in combination an arm whereon two protruding walls are formed in parallel relationship to each other, a pair of inclined slideways located on the inner opposite surfaces of said walls and a block slidably engaged with said slideways, a lens tube held on said block, screws connecting said walls whereby the engagement between the slideways and block may be adjusted, a rack fixed to said block and a pinion meshed therewith for moving the block, a shaft fixed to said pinion and extending through clearance apertures in said walls, an enlongated bearing member for said shaft supporting the latter only at one end of the pinion and extending through one of said apertures, said bearing member having a radial flange secured only to one of said walls and being the sole support for said shaft, and holding screws for the bearing, said screws being anchored in said arm and passing through oversize holes in said flange whereby said bearing may be shifted in a plane normal to the pitch line plane of the rack to change the pressure between the teeth of the rack and pinion.

2. In a microscope, the combination of an arm having two spaced substantially parallel walls projecting therefrom, sideways formed on the respective walls, a block of plastic material slidably mounted on the slideways, a lens tube carried by the block, screws connecting the walls whereby the slideways may be moved toward or from each other for varying the frictional engagement between the block and the slideways, said walls having aligned apertures, a sleeve bearing member mounted on only one of the walls and projecting into one of the apertures with clearance, a shaft rotatably mounted in the bearing member and projecting through the other aperture with clearance, a pinion fixed to the shaft, a rack fixed to the block and in operative relation with the pinion whereby rotation of the shaft will move the lens tube, said bearing member being the sole means for supporting the shaft on the arm whereby adjustment of the slideways may be made without causing a binding action on said shaft.

3. The combination in a microscope of an arm provided with a substantially U-shaped portion having a pair of outstanding walls, a pair of slideways located opposite each other on the inner surfaces of said walls, a lens tube, a slide carrying said tube and slidably engaged with said slideways, means for adjustably moving the slideways toward and away from each other to vary the engagement with the slide, a rack secured to the slide, a pinion in mesh with the rack for moving the lens tube, a shaft fixedly carrying the pinion, a cylindrical bearing member for rotatably supporting said shaft, said member being positioned between one end of the pinion and one end of the shaft and providing the sole bearing means for the shaft, said bearing member projecting through a clearance aperture in one of the walls, the portion of the shaft on the other side of the pinion extending through a clearance aperture in the other wall, and a flange on said member, said flange being secured to the outer face of the adjacent wall by screws passing through oversize holes in the flange whereby the pitch line clearance between the teeth of the rack and pinion may be adjusted.

JOHN C. KURTZ.
BERNHARDT GEORGE GALLASCH.

REFERENCES CITED

The following references are of record in the file of this patent:

UNITED STATES PATENTS

| Number | Name | Date |
|---|---|---|
| 347,377 | Pringle | Aug. 17, 1886 |
| 382,964 | Fraley | May 15, 1888 |
| 1,333,490 | Hines | Mar. 9, 1920 |
| 2,410,643 | Fielding | Nov. 5, 1946 |
| 2,449,156 | Wittig | Sept. 14, 1948 |
| 2,544,371 | Weiser | Mar. 6, 1951 |

FOREIGN PATENTS

| Number | Country | Date |
|---|---|---|
| 13,242 | Great Britain | of 1908 |
| 194,099 | Great Britain | Mar. 8, 1923 |